P. SHEEDY & D. P. KELLOGG.
LOCKING MECHANISM FOR VALVE REVERSING GEARS.
APPLICATION FILED APR. 18, 1916.
1,195,614.
Patented Aug. 22, 1916
3 SHEETS—SHEET 1.
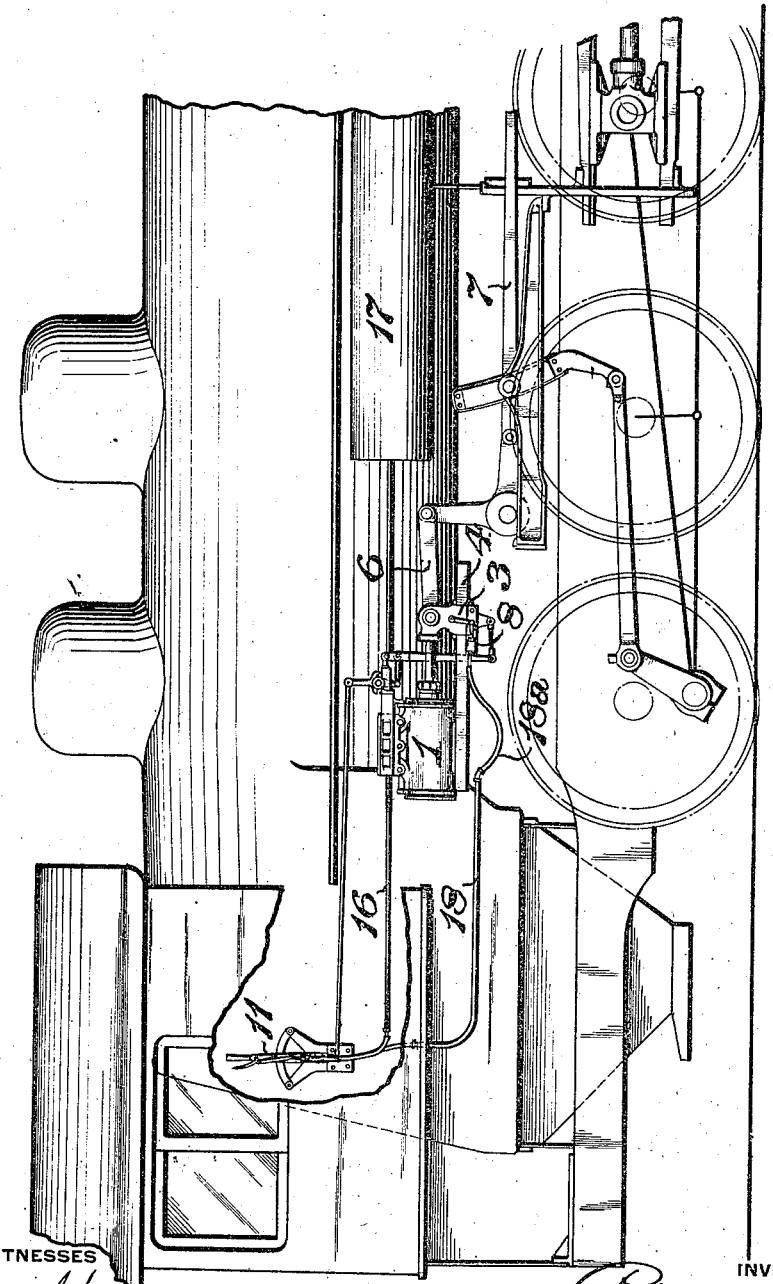

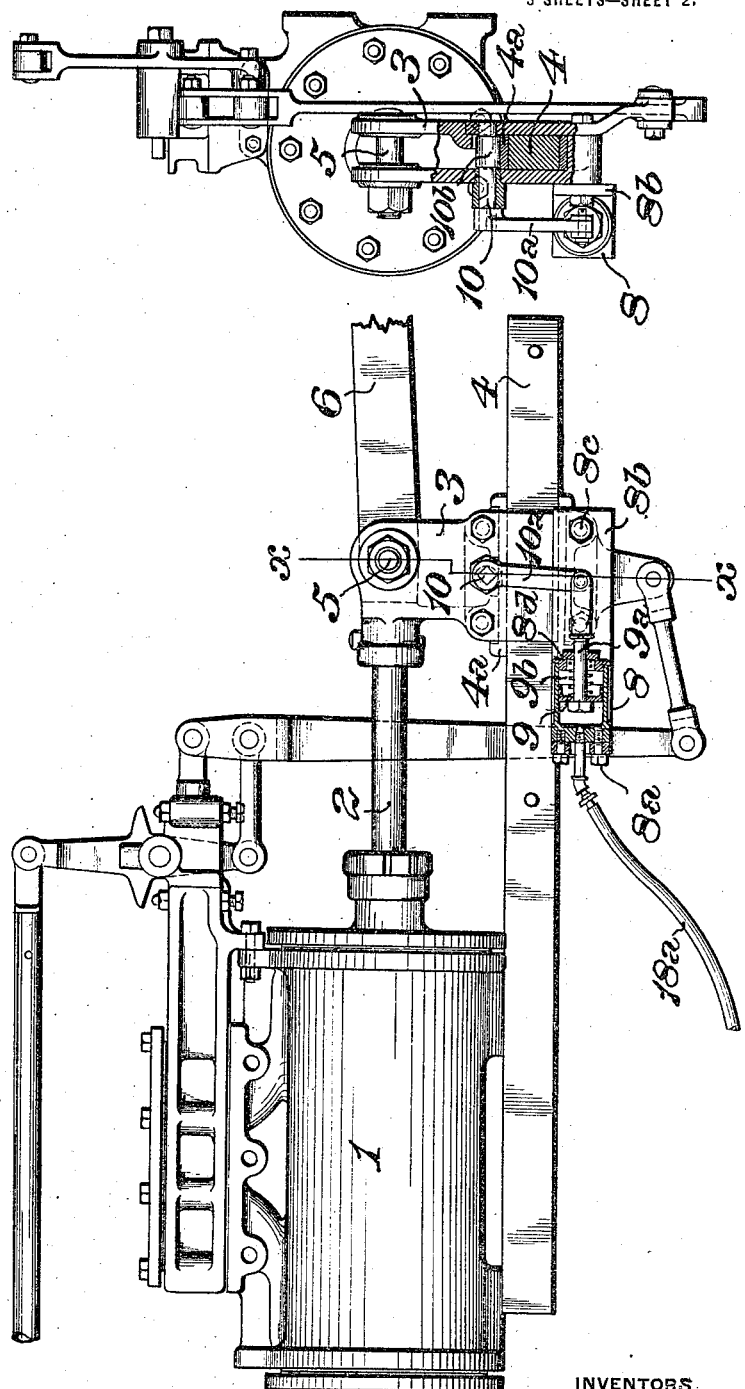

P. SHEEDY & D. P. KELLOGG.
LOCKING MECHANISM FOR VALVE REVERSING GEARS.
APPLICATION FILED APR. 18, 1916.
1,195,614.
Patented Aug. 22, 1916.
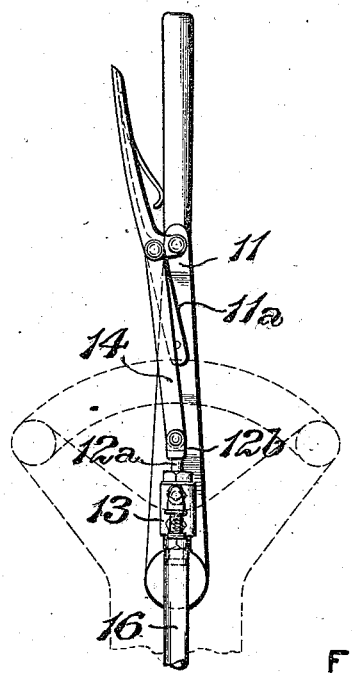
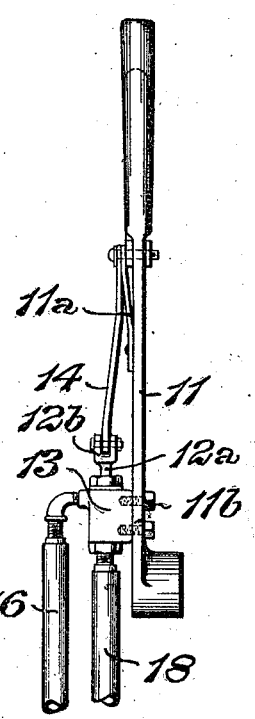
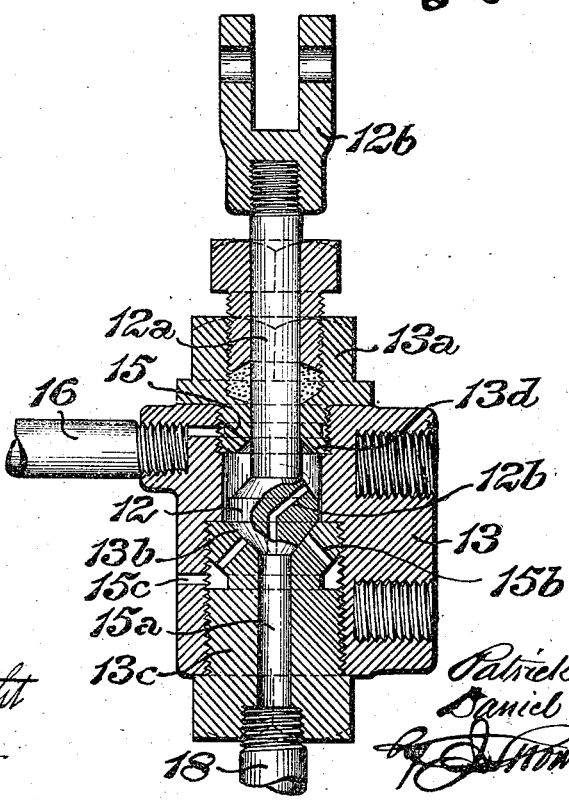

UNITED STATES PATENT OFFICE.

PATRICK SHEEDY AND DANIEL P. KELLOGG, OF LOS ANGELES, CALIFORNIA.

LOCKING MECHANISM FOR VALVE-REVERSING GEARS.

1,195,614.          Specification of Letters Patent.   Patented Aug. 22, 1916.

Application filed April 18, 1916. Serial No. 91,874.

*To all whom it may concern:*

Be it known that we, PATRICK SHEEDY, and DANIEL P. KELLOGG, both of Los Angeles, in the county of Los Angeles and State of California, have jointly invented a certain new and useful Improvement in Locking Mechanism for Valve-Reversing Gears, of which improvement the following is a specification.

The object of our invention is to provide mechanism, of simple and inexpensive construction and ready applicability to power actuated valve reversing gears of present standard types, whereby the reversing gear may be automatically and positively locked in any adjusted position, so that the operation of the engine at any determined point of cut off shall be maintained until it is desired to be varied by the operator, and undesired change of position, as by variation in the strains exerted by the valves, or leakage of operating motive fluid through packing glands, etc., be effectively obviated.

The improvement claimed is hereinafter fully set forth.

In the accompanying drawings: Figure 1 is a diagrammatic view, in elevation, of the rear right side portion of a locomotive engine, illustrating an application of our invention; Fig. 2, a view, in elevation and on an enlarged scale, of the reverse gear of Fig. 1, with the locking cylinder shown in longitudinal central section; Fig. 3, a vertical transverse section, on the line *x x* of Fig. 2; Fig. 4, a side view, in elevation, of the reverse lever and its connections; Fig. 5, a front view of the same; and, Fig. 6, a longitudinal central section, on a further enlarged scale, through the casing of the locking cylinder control valve.

Our invention, while herein exemplified as applied in a power actuated valve reversing gear of the well known Ragonnet type, is equally applicable in connection with any other design of power reversing gear in which a reach rod is connected to members of valve actuating mechanisms and to a longitudinally movable cross head, and is moved by the latter, to vary the positions of the valve gear members, through the action of fluid pressure on a piston working in a reversing cylinder.

In the practice of our invention, referring to the specific embodiment thereof which is herein exemplified, it is therein shown as applied to a Ragonnet valve reversing gear having a reversing cylinder, 1, fitted with a properly packed piston, fixed on a piston rod, 2, the outer end of which carries a cross head, 3, which works on a guide, 4, and is coupled by a pin, 5, to the rear end of a reach rod, 6, the forward end of which is coupled to the radius rod, 7, of a Walschaerts valve gear.

The locking mechanism which we provide is of the following construction. A fluid pressure locking cylinder, 8, is secured by bolts, 8ª, to a bracket, 8ᵇ, which is, in turn, secured by bolts, 8ᶜ, to the cross head, 3, of the reverse gear, the axis of the cylinder being parallel with the guide, 4, thereof. A piston, 9, is fitted in the locking cylinder, and is secured upon a rod, 9ª, extending through the head, 8ᵈ, of the cylinder, and a spring, 9ᵇ, is interposed between the piston and the head, 8ᵈ, for moving the piston inwardly, when pressure upon it is released. The outer end of the piston rod, 9ª, is coupled to an arm, 10ª, fixed on a horizontal shaft, 10, which is journaled in the cross head, transversely to the guide, 4, thereof, and above a gib, 4ª, interposed between the cross head and guide. The shaft, 10, has an eccentric, 10ᵇ, formed upon it, which, when the shaft is partially rotated by the outward movement of the piston, presses the gib firmly against the guide, and thereby locks the cross head to the guide, in any position of the former thereon in which partial rotation may be imparted to the shaft by the exertion of pressure on the piston. Upon the relief of pressure from the piston, the spring, 9ᵇ, returns it to its normal position at the rear of the locking cylinder, and the resultant partial rotation of the shaft, 10, releases the eccentric, 10ᵇ, from its bearing upon the gib, 4ª, and permits free movement of the cross head in either direction.

The supply and exhaust of motive fluid to and from the locking cylinder are automatically effected, in accordance with the release and supply, respectively, of motive fluid from and to the reversing cylinder, 1, by a control valve, which is connected to the reverse lever, 11, and is actuated by the movements of the latch lever, 11ª, thereof, which are made by the engineer, preliminary to the movement and cessation of movement, respectively, of the reverse lever, in making adjustments of the valve gear by the piston of the reversing cylinder. The control valve, 12, which is of the double seated puppet type, is fixed on a stem, 12$^a$, which passes through a stuffing box, 13$^a$, connected to a valve casing, 13, secured to the reverse lever, 11, by bolts, 11$^b$. The stem, 12$^a$, carries, on its outer end, a jaw or clevis, 12$^b$, which is coupled, by a link, 14, to the latch lever, 11$^a$. The control valve fits normally, in the operation of the locomotive, on a lower seat, 13$^b$, at the top of a removable head, 13$^c$, screwed into the lower end of the casing, and is also adapted to fit against an upper seat, 13$^d$, on the inner end of the stuffing box, 13$^a$. A port, 12$^b$, which is restricted in diameter relatively to the fluid pressure supply of the valve casing, extends through the control valve; a port, 15, leads from the upper valve seat, 13$^d$, to a supply pipe, 16, which connects the valve casing with a suitable source of fluid pressure supply, as the main air reservoir, 17, of the air brake apparatus; a passage, 15$^a$, leads from the lower valve seat, 13$^b$, to a pipe, 18, connecting the valve casing with a flexible hose section, 18$^a$, which is, in turn, connected to the rear end of the locking cylinder; and ports, 15$^b$, lead from the lower valve seat to an atmospheric exhaust port, 15$^c$, in the casing. The flexible hose section permits the movement of the locking cylinder with the cross head to which it is connected, without presenting any joint at which leakage could take place.

In the operation of the appliance, the control valve is normally in the position shown in Fig. 6, the piston of the reversing cylinder being consequently subject to pressure from the main reservoir, through the pipes, 16, 18 and 18$^a$, and being at the forward limit of its traverse, in which position the cross head, 3, of the reversing cylinder, is locked to the guide, 4, by the pressure of the eccentric, 10$^b$, on the gib, 4$^b$. When the engineer desires to make an adjustment of the valve gear in either direction, he releases the reverse lever from its quadrant, by pressure on the latch lever, 11$^a$, in the usual manner. The upward movement of the latch lever brings the connected control valve, 12, against its upper seat, 13$^d$, thereby cutting off the supply of pressure to the locking cylinder and opening the latter to the atmosphere through the passage, 15$^a$, port, 15$^b$, and exhaust port, 15$^c$. Upon the consequent release of pressure from the locking cylinder, the spring, 9$^b$, moves the piston thereof and releases the bearing of the eccentric, 10$^b$, on the gib, 4$^b$. The cross head being then unlocked, the engineer moves the reverse lever to the desired position and the piston of the reversing cylinder correspondingly moves the cross head and reach rod. When the engineer has made the desired adjustment of the valve gear, he releases the latch lever and thereby engages the reverse lever with its segment. The downward movement of the latch lever returns the control valve to the normal position shown in Fig. 6, and by actuating pressure to the locking cylinder locks the cross head in the position in which the valve gear has been adjusted. The port opening through the control valve being restricted, the pressure flows comparatively slowly to the locking cylinder, so that the valve gear will be permitted to equalize and become stationary before the locking of the cross head is effected.

It will be seen that our improvement may be readily applied to any reversing gear of the type of that which is herein exemplified, without substantial cost or interference with existing structural or operative conditions, and that, in its operation, the reversing gear is automatically locked and unlocked in and by the manipulation of the reverse lever in controlling the reversing gear for making and maintaining desired adjustments of the valve gear.

We claim as our invention and desire to secure by Letters Patent:

The combination, with a valve reversing gear comprising a fluid pressure reversing cylinder, a cross head movable by pressure therein, and a guide on which said cross head traverses, of a locking cylinder connected to and movable with the cross head; a piston and rod working therein, a shaft journaled transversely in the cross head and having an arm coupled to the piston rod of the locking cylinder; an eccentric on said shaft; a gib fitted between the cross head and guide, in position to be subject to pressure from the eccentric; a reverse lever controlling the supply and exhaust of motive fluid to and from the reversing cylinder; a latch lever holding the reverse lever in adjusted position; and valve mechanism, connected to and operable by the latch lever, for controlling fluid pressure admission and exhaust to and from the locking cylinder.

PATRICK SHEEDY.
DANIEL P. KELLOGG.

Witnesses:
W. B. TUDOR,
J. W. MARTINSON.